C. P. SCHOU.
MEANS FOR ATTACHING RESERVE WHEELS AND TIRES TO MOTOR CARS.
APPLICATION FILED JULY 22, 1919.
1,321,247. Patented Nov. 11, 1919.
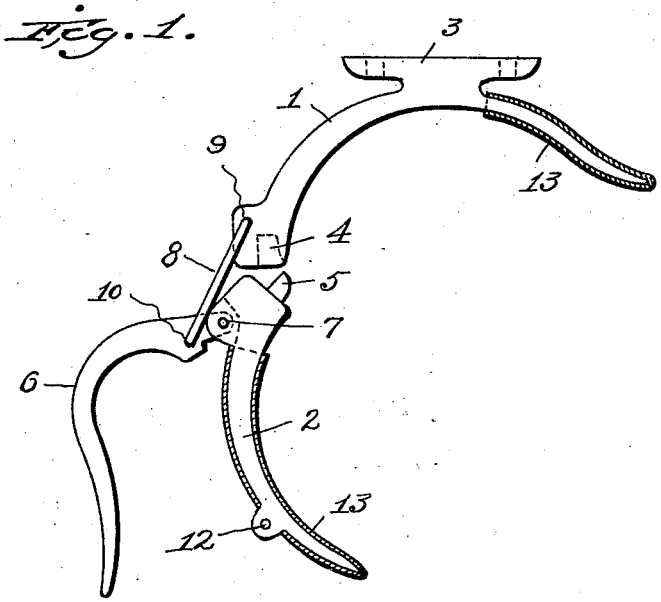
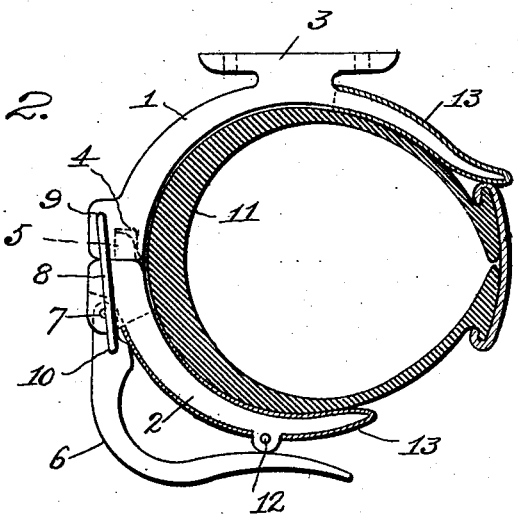
Inventor
Carl Pihl Schou
By Kenyon &c
Attorney

UNITED STATES PATENT OFFICE.

CARL P. SCHOU, OF HJULA, CHRISTIANIA, NORWAY.

MEANS FOR ATTACHING RESERVE WHEELS AND TIRES TO MOTOR-CARS.

1,321,247. Specification of Letters Patent. Patented Nov. 11, 1919.

Application filed July 22, 1919. Serial No. 312,632.

*To all whom it may concern:*

Be it known that I, CARL PIHL SCHOU, a subject of the King of Norway, residing at Hjula, Christiania, Kingdom of Norway, have invented certain new and useful Improvements in Means for Attaching Reserve Wheels and Tires to Motor-Cars; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to means for attaching reserve wheels and tires to motor cars. The object of the invention is to provide a carrier by means of which the wheel or tire can be quickly and securely attached, or detached, and the invention consists in providing a suitable carrier that may be opened and closed by means of a lever which constitutes part of an articulated connection between the members of the carrier and also operates as the locking member therefor.

In the accompanying drawing—

Figure 1 is a side view of a carrier embodying the invention, the parts being shown in open position, and Fig. 2 is a side view of the carrier in closed position with a reserve tire and rim mounted therein.

The carrier comprises a support or clamp consisting of two substantially crescent shaped members 1 and 2, the member 1 having a bracket 3 formed on its convex side by means of which it is bolted onto the car body. In the lower end of the member 1 is formed a socket 4 designed to receive a lug 5 formed on one end of the member 2, said socket and lug forming a rigid connection between the clamping members when said members are in closed position.

A lever 6 is pivotally mounted on the member 2, near the lug 5, by means of a pin 7, and the lever 6 and member 1 are loosely articulated together by means of an elastic wire hoop or loop 8, or the like, which is pivotally connected to the member 1 and the lever 6 at the points 9 and 10 respectively.

When a tire 11 is mounted in the carrier, and the latter closed as shown in Fig. 2, the distance between the points 9 and 10 is greater than the distance between the point 9 and the pin 7, and the link 8 lies in a plane inclined to a line drawn between the point 9 and pin 7 and a little within the latter. In other words, a portion of the link lies between the pin 7 and the member 2. In order to be brought to this position, the lever 6 must be swung over a dead center position, the elastic hoop being a little strained during the swinging. The tension effected by the spring force of the wire hoop in closed position of the carrier, keeps the lever 6 in this position and the members 1 and 2 are rigidly connected together by the coöperation of the lug 5.

To prevent tampering or unlicensed removal of the tire, the lever and member 2 may be locked together by a padlock (not shown) of well known type, the member 2 having a perforated ear 12 to receive the bow or hasp of the lock which surrounds the lever.

The members 1 and 2 are preferably covered or lined with leather or rubber shields 13 to protect the tires against wear by the metal.

It will be apparent that various changes or modifications may be made to the carrier and will readily suggest themselves to anyone making and using the same, and I do not, therefore, restrict myself to the specific construction of parts herein shown and described, but reserve to myself all equivalents thereof as might come within the terms of the claims.

I claim—

1. A tire carrier comprising two separable supporting members having free disconnected ends, a lever mounted on and pivotally connected to one of said members under all conditions of operation, and an articulated connection between the lever and other member coöperating with the lever to rigidly lock said members together.

2. A tire carrier comprising two separable supporting members having free disconnected ends, a lever pivotally mounted on and attached to one of said members, and an elastic member pivotally connecting the lever to the other member.

3. A carrier for automobile tires comprising a fixed member and a movable member having free disconnected ends, a lever pivotally connected to the movable member, and an articulated connection between the lever and fixed member coöperating with the lever to lock the fixed and movable members together at their other ends.

4. A tire carrier comprising a fixed member and a movable member having free disconnected ends, a lever pivoted on the movable member, an elastic hoop pivotally connected to the fixed member and to the lever and adapted to form a rigid connection between the fixed and movable members at their other ends.

5. A tire carrier comprising a fixed member having a socket in one end thereof, a movable member having a lug to engage said socket, a lever pivoted on the movable member adjacent the lug, and an elastic hoop pivoted on the fixed member and pivotally connected to the lever beyond the pivotal point of the latter.

6. A carrier for reserve tires and wheels for motor cars, comprising a member adapted to be fixed to a car and having a socket in one end, a separate movable member having a lug to fit the socket and form a rigid connection between said members, a lever pivoted on the movable member, and an elastic hoop pivotally connected to the lever and fixed member, the points of connection of said hoop being such that the point of connection on the lever is carried by the latter beyond the dead center of the pivotal point of the lever, whereby the tension of the hoop holds the lever in locking position.

In testimony that I claim the foregoing as my invention, I have signed my name.

CARL P. SCHOU.

Copies of this patent may be obtained for five cents each, by addressing the "Commissioner of Patents, Washington, D. C."